(12) United States Patent
Uejo et al.

(10) Patent No.: US 11,949,828 B2
(45) Date of Patent: *Apr. 2, 2024

(54) INFORMATION PROCESSING APPARATUS, INFORMATION PROCESSING SYSTEM, AND NON-TRANSITORY COMPUTER READABLE MEDIUM FOR PERFORMING PREPROCESSING AND CHARACTER RECOGNITION TO ACQUIRE ITEM AND VALUE OF IMAGE

(71) Applicant: FUJIFILM Business Innovation Corp., Tokyo (JP)

(72) Inventors: Hiroyoshi Uejo, Kanagawa (JP); Yuki Yamanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,487

(22) Filed: Dec. 29, 2022

(65) Prior Publication Data

US 2023/0135568 A1 May 4, 2023

Related U.S. Application Data

(63) Continuation of application No. 17/672,631, filed on Feb. 15, 2022, now Pat. No. 11,570,323, which is a (Continued)

(30) Foreign Application Priority Data

Mar. 26, 2020 (JP) .................................. 2020-056635

(51) Int. Cl.
*H04N 1/46* (2006.01)
*G06V 10/20* (2022.01)
(Continued)

(52) U.S. Cl.
CPC ......... *H04N 1/00814* (2013.01); *G06V 10/20* (2022.01); *G06V 30/155* (2022.01);
(Continued)

(58) Field of Classification Search
None
See application file for complete search history.

(56) References Cited

U.S. PATENT DOCUMENTS

2017/0251126 A1* 8/2017 Fujita ................. H04N 1/00244
2019/0228252 A1* 7/2019 Peng .................... G06V 30/147
(Continued)

FOREIGN PATENT DOCUMENTS

| JP | H11154198 | 6/1999 |
| JP | 2000113100 | 4/2000 |
| JP | 2021144469 | 9/2021 |

OTHER PUBLICATIONS

"Notice of Reasons for Refusal of Japan Counterpart Application", dated Dec. 12, 2023, with English translation thereof, p. 1-p. 8.

*Primary Examiner* — Dung D Tran
(74) *Attorney, Agent, or Firm* — JCIPRNET

(57) ABSTRACT

An information processing apparatus includes a processor configured to acquire, from a read image, a predetermined item, and a value corresponding to the item, the read image being obtained by reading a document and being subjected, prior to acquisition of the item and the value, to preprocessing and character recognition. Further, the processor is configured to, in response to not successfully acquiring at least one of the item and the value, change a setting on the preprocessing or a setting on the character recognition in accordance with the acquisition or non-acquisition state of the item and the value, and then perform the preprocessing or the character recognition. In response to not successfully acquiring at least one of the item and the value, the processor
(Continued)

is further configured to identify where the item and the value are located.

16 Claims, 7 Drawing Sheets

Related U.S. Application Data continuation of application No. 17/037,653, filed on Sep. 29, 2020, now Pat. No. 11,265,435.

(51) Int. Cl.
*G06V 30/148* (2022.01)
*G06V 30/412* (2022.01)
*H04N 1/00* (2006.01)
*H04N 1/62* (2006.01)
*G06V 30/10* (2022.01)

(52) U.S. Cl.
CPC ............ *G06V 30/412* (2022.01); *H04N 1/62* (2013.01); *G06V 30/10* (2022.01)

(56) References Cited

U.S. PATENT DOCUMENTS

| | | | |
|---|---|---|---|
| 2020/0117962 A1* | 4/2020 | Kim | G06V 30/142 |
| 2020/0311471 A1* | 10/2020 | Takara | G06F 18/21 |
| 2021/0099586 A1* | 4/2021 | Tanaka | H04N 1/00331 |

\* cited by examiner

FIG. 6

| PRIORITY | HANDLING METHOD | TARGET APPARATUS | PROBLEM DETAILS ||||| 
|---|---|---|---|---|---|---|---|
| | | | ITEM | CHARACTER STRING | TABLE | READ IMAGE | OCR |
| 1 | REMOVE WATERMARK | PREPROCESSING APPARATUS | ○ | ○ | ○ | ○ | — |
| 2 | REMOVE BACKGROUND PATTERN | PREPROCESSING APPARATUS | ○ | ○ | ○ | ○ | — |
| 3 | INVERT WHITE-ON-BLACK TEXT | PREPROCESSING APPARATUS | ○ | ○ | — | — | — |
| 4 | | RECOGNITION APPARATUS | ○ | ○ | — | — | — |
| 5 | REMOVE SHADING | PREPROCESSING APPARATUS | ○ | ○ | ○ | ○ | — |
| 6 | REMOVE COLORED BACKGROUND | PREPROCESSING APPARATUS | ○ | ○ | ○ | ○ | — |
| 7 | CHANGE OCR DICTIONARY | RECOGNITION APPARATUS | — | — | ○ | ○ | ○ |
| 8 | CHANGE OCR ENGINE | RECOGNITION APPARATUS | ○ | ○ | ○ | ○ | ○ |
| 9 | CHANGE AI ENGINE | PREPROCESSING APPARATUS | ○ | ○ | ○ | ○ | — |
| 10 | CHANGE LEARNING MODEL | PREPROCESSING APPARATUS | ○ | ○ | ○ | ○ | — |
| 11 | CHANGE RELATIVE POSITION | RECOGNITION APPARATUS | — | ○ | — | — | — |

INFORMATION PROCESSING APPARATUS, INFORMATION PROCESSING SYSTEM, AND NON-TRANSITORY COMPUTER READABLE MEDIUM FOR PERFORMING PREPROCESSING AND CHARACTER RECOGNITION TO ACQUIRE ITEM AND VALUE OF IMAGE

CROSS REFERENCE TO RELATED APPLICATIONS

This application is a continuation application of and claims the priority benefit of a prior application Ser. No. 17/672,631 filed on Feb. 15, 2022, now allowed. The prior application Ser. No. 17/672,631 is a continuation application of and claims the priority benefit of a prior application Ser. No. 17/037,653 filed on Sep. 29, 2020, now patented and claims the priority benefit of Japan application serial no. 2020-056635, filed on Mar. 26, 2020. The entirety of each of the above-mentioned patent applications is hereby incorporated by reference herein and made a part of this specification.

TECHNICAL FIELD

The present disclosure relates to an information processing apparatus, an information processing system, and a non-transitory computer readable medium.

RELATED ART

Japanese Patent No. 6528147 discloses an accounting-data input support system for use in an accounting support system that performs preprocessing, character recognition processing, and postprocessing to generate text data of a recognition result. The preprocessing involves performing image processing, which includes density adjustment, background processing, or other processes on a read image obtained by reading an original voucher to thereby determine where a character string is located in the read image, and taking out the character string or a character from the read image. The character recognition processing involves recognition of a character. The postprocessing is performed subsequent to the character recognition processing.

The accounting-data input support system includes a recognition processing unit, an evaluation processing unit, and an overall-comparison-evaluation processing unit. The recognition processing unit performs recognition processing, the recognition processing including preprocessing, character recognition processing, and postprocessing including analysis of an object being recognized. The recognition processing unit outputs the status of each processing, a recognition result, and "recognition confidence information" based on the status of some processing including the similarity of features with dictionary data during character recognition. The evaluation processing unit acquires the processing status of each processing constituting the recognition processing, which is generated by the recognition processing unit, evaluates the confidence of each processing status obtained by applying a first evaluation parameter to each processing status, determines the confidence of each processing as a whole, and outputs "evaluation confidence information" through processing performed independently from the recognition processing unit. The overall-comparison-evaluation processing unit outputs an overall confidence, which is determined by comparing the recognition confidence information with the evaluation confidence information, and applying a second evaluation parameter to the comparison result.

The accounting-data input support system includes a memory. The memory includes a recognition DB, and an evaluation DB. The recognition DB is used to record a recognition dictionary used for the recognition processing, and various recognition parameters. The evaluation DB is used to record, as occasion demands, the processing status of each processing step of the recognition processing, and to store an evaluation parameter serving as an index for evaluating processing status. Further, the recognition DB is used to record the first evaluation parameter, and the second evaluation parameter. The first evaluation parameter is used to, based on the processing status of each processing status, evaluate the confidence of processing status as a whole, and generate "evaluation confidence information". The second evaluation parameter is used to compare the "recognition confidence information" with the "evaluation confidence information" to perform an overall evaluation.

The recognition processing unit outputs preprocessing information that represents the processing status during preprocessing. The recognition processing unit outputs character-recognition processing information that represents the processing status during character recognition processing. The recognition processing unit outputs analysis processing information that represents the status of analysis of a recognition result in accordance with the characteristics of the original voucher. The recognition processing unit outputs, as the "recognition confidence information", the confidence of the overall recognition processing.

The evaluation processing unit acquires the preprocessing information generated by the recognition processing unit. The evaluation processing unit acquires the character-recognition processing information generated by the recognition processing unit. The evaluation processing unit acquires the analysis processing information generated by the recognition processing unit. The evaluation processing unit applies the first evaluation parameter to each element of information that makes up each of the preprocessing information, the character-recognition processing information, and the analysis processing information to thereby calculate a basic evaluation value for each processing information mentioned above. Then, if a specific piece of processing information has a much lower basic evaluation value than other pieces of processing information, the evaluation processing unit makes an adjustment to lower the evaluation even if the other pieces of processing information have basic evaluation values greater than or equal to a predetermined value, and then generates the "evaluation confidence information".

The overall-comparison evaluation processing unit compares the recognition confidence information with the evaluation confidence information, and applies the second evaluation parameter to the comparison result to thereby output an overall confidence.

There are services with which, for example, a document is read, and character information contained in the document is recognized and output. Further, there are information processing apparatuses that use this service to detect an item that has been set for the document, and acquire, from the document, a character string associated with the detected item.

In some cases, recognition of a character string from a document may fail due to a watermark, a background pattern, and other markings placed on the document. To address this, in recent years, such a watermark, a background pattern, and other markings are sometimes removed to enable recognition of such a character string. Specifically, as processing performed prior to recognizing a character string (to be referred to as "preprocessing" hereinafter), a watermark, a background pattern, and other markings are removed by using a learning model, the learning model being obtained by training an artificial intelligence (AI) or other systems with a document having such a watermark, a background, and other markings placed thereon.

One issue with the above-mentioned approach, however, is that if an item and a character string are not successfully acquired from a document, a process that has a problem needs to be identified from among a series of preprocessing processes performed prior to the user's acquisition of the item or character string, and a series of character-information recognition processes, and processing then needs to be re-executed from the process where the problem has occurred.

SUMMARY

Aspects of non-limiting embodiments of the present disclosure relate to an information processing apparatus, an information processing system, and a non-transitory computer readable medium that, if an item and a character string are not successfully acquired from a document, make it possible to select a preprocessing process and a character-information recognition process that allow for successful acquisition of the item and the character string, and to re-execute the acquisition of the item and the character string.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to acquire, from a read image, a predetermined item, and a value corresponding to the item, the read image being obtained by reading a document, the read image being subjected, prior to acquisition of the item and the value, to preprocessing and character recognition. Further, the processor is configured to, in response to not successfully acquiring at least one of the item and the value, change a setting on the preprocessing or a setting on the character recognition in accordance with the acquisition or non-acquisition state of the item and the value, and then perform the preprocessing or the character recognition. Moreover, in response to not successfully acquiring at least one of the item and the value, the processor is further configured to identify where the item and the value are located.

BRIEF DESCRIPTION OF THE DRAWINGS

Exemplary embodiment of the present disclosure will be described in detail based on the following figures, wherein:

FIG. 6 schematically illustrates an exemplary priority database in accordance with the exemplary embodiment;

DETAILED DESCRIPTION

An exemplary embodiment of the present disclosure will be described below in detail with reference to the drawings. The following description will be directed to an exemplary case in which an information processing apparatus 10 according to the exemplary embodiment is a server that manages information such as image data obtained by reading a document or a form, and an optical character recognition (OCR) result. However, this is not to be construed restrictively. The information processing apparatus 10 may be incorporated in a multifunction machine having print, copy, scan, facsimile, and other functions, or may be incorporated in a terminal such as a personal computer.

Figure 1:
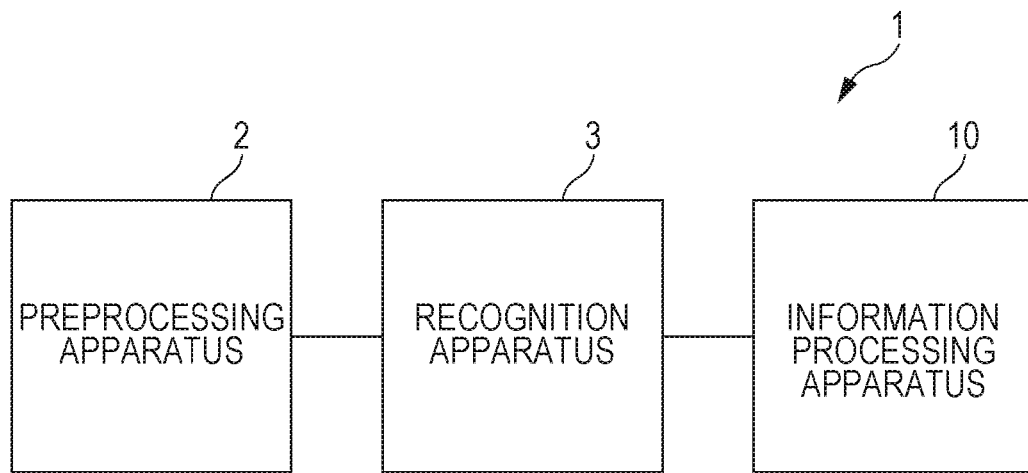
FIG. 1 is a block diagram illustrating an exemplary configuration of an information processing system in accordance with the exemplary embodiment.

FIG. 1 is a block diagram illustrating an exemplary configuration of an information processing system 1 in accordance with the exemplary embodiment. As illustrated in FIG. 1, the information processing system 1 according to the exemplary embodiment includes a preprocessing apparatus 2, a recognition apparatus 3, and the information processing apparatus 10.

The preprocessing apparatus 2 performs, on an image obtained by reading a document (to be referred to as "read image" hereinafter), processing for facilitating the recognition of an item and a character string contained in the read image (to be referred to as "preprocessing" hereinafter), prior to performing OCR processing on the read image. In this regard, preprocessing refers to processing performed on a read document prior to execution of OCR processing. In the exemplary embodiment, preprocessing refers to processing executed prior to OCR processing to facilitate the recognition of an item and a character string. For example, preprocessing includes processes such as straightening performed to correct misalignment of a read image, denoising performed to remove non-character-string elements, and binarization to convert a character string into two gray levels. The preprocessing apparatus according to the exemplary embodiment further executes the following processes as preprocessing: inverting the color of white-on-black text that has a black background with a character string in white; removing shading, diagonal lines, and other markings applied to a character string; removing the background color of a document; and removing a watermark or a background pattern. Hereinafter, inverting the color of white-on-black text will be referred to as "inversion of white-on-black text", removing shading, diagonal lines, or other markings applied to a character string will be referred to as "shading removal", removing a watermark will be referred to as "watermark removal", and removing a background pattern will be referred to as "background-pattern removal".

The recognition apparatus 3 executes OCR processing on an image obtained after preprocessing is performed on a read image by the preprocessing apparatus 2 (to be referred to as "processed image" hereinafter), and recognizes a character string from the processed image.

The information processing apparatus 10 acquires the result of the recognition executed by the recognition apparatus 3, and extracts an item and a character string. The information processing apparatus 10 according to the exemplary embodiment extracts a character string associated with a prespecified item. Specifying an item in advance, and extracting a character string associated with the specified item in this way is called "key-value extraction". The following description of the exemplary embodiment will be directed to extraction of a character string (value) corresponding to an item (key) written in each individual document. For key-value extraction, the relative position of a character string associated with an item (i.e., the positional relationship between an item and a character string, which in the exemplary embodiment refers to where a character string can possibly exist with reference to an item) needs to be set in advance. The following description of the exemplary embodiment will be directed to a case in which a setting is made so as to extract a character string located below or to the right of an item. Examples of items according to the exemplary embodiment include information such as "name" and "article name". Examples of character strings according to the exemplary embodiment include "Fuji Taro", "monitor", and other specific descriptions corresponding to each individual item. A character string is an example of a value. The recognition apparatus 3 according to the exemplary embodiment is an example of a character recognition apparatus.

Figure 2:
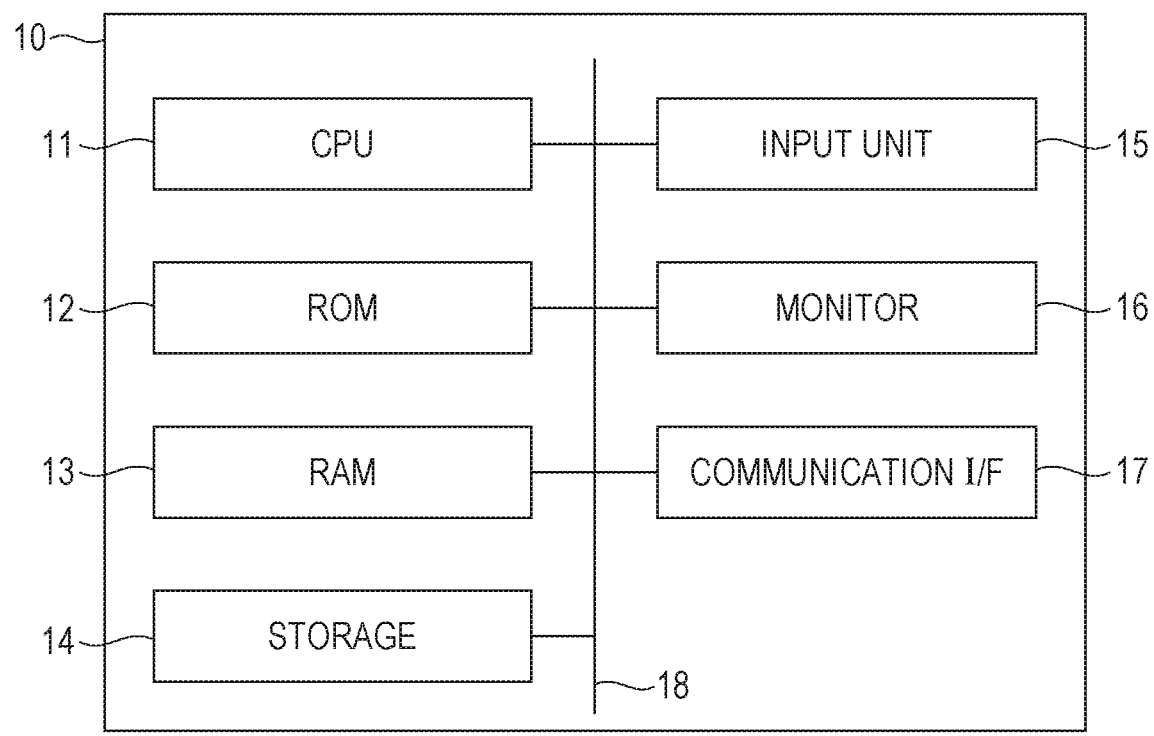
FIG. 2 is a block diagram illustrating an exemplary hardware configuration of an information processing apparatus in accordance with the exemplary embodiment.

With reference to FIG. 2, the hardware configuration of the information processing apparatus 10 will be described below. FIG. 2 is a block diagram illustrating an exemplary hardware configuration of the information processing apparatus 10 in accordance with the exemplary embodiment. As illustrated in FIG. 2, the information processing apparatus 10 according to the exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are interconnected by a bus 18. The CPU 11 is an example of a processor.

The CPU 11 controls the entire information processing apparatus 10 in a centralized manner. The ROM 12 stores various programs including an information processing program, data, and other information that are used in the exemplary embodiment. The RAM 13 is a memory used as a work area during execution of various programs. The CPU 11 loads a program stored in the ROM 12 into the RAM 13, and executes the program to carry out the process of extracting an item and a character string from a character recognition result, and storing the extracted item and the extracted character string. The storage 14 is, for example, a hard disk drive (HDD), a solid state drive (SSD), or a flash memory. The storage 14 may store an information processing program or other information. The input unit 15 is a keyboard, a mouse, or other devices to accept input of a character or other information. The monitor 16 displays image data or other information. The communication I/F 17 transmits and receives data.

Figure 3:
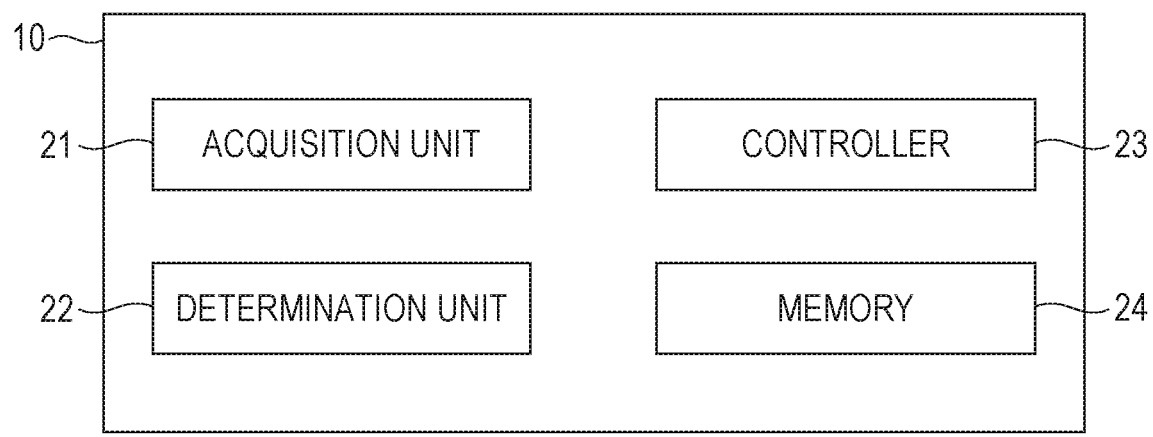
FIG. 3 is a block diagram illustrating an exemplary functional configuration of the information processing apparatus in accordance with the exemplary embodiment.

The functional configuration of the information processing apparatus 10 will be described below with reference to FIG. 3. FIG. 3 is a block diagram illustrating an exemplary functional configuration of the information processing apparatus 10 in accordance with the exemplary embodiment.

As illustrated in FIG. 3, the information processing apparatus 10 includes an acquisition unit 21, a determination unit 22, a controller 23, and a memory 24. By executing an information processing program, the CPU 11 functions as the acquisition unit 21, the determination unit 22, the controller 23, and the memory 24.

The acquisition unit 21 acquires an item and a character string from a character recognition result obtained by character recognition performed on a read image.

The determination unit 22 determines whether the item and the character string have been acquired successfully. For example, if an item and a character string have been successfully acquired from a character recognition result, the determination unit 22 determines that the item and the character string have been successfully recognized.

In response to determining that an item and a character string have been successfully acquired, the determination unit 22 determines whether the acquired character string corresponds to the item. For example, the determination unit 22 compares character string candidates corresponding to the item that are acquired from the memory 24 described later, with the acquired character string to determine whether the acquired character string corresponds to the item. In this regard, character string candidates refer to a list of character strings, numbers, and symbols that correspond to an item of interest. For example, if an item of interest is "date", expected corresponding character strings are numbers, number separator symbols, and characters. Thus, examples of character string candidates in this case include full-width numbers, half-width numbers, number separator symbols such as "1", and characters such as "year", "month", and "day". That is, the determination unit 22 acquires candidates corresponding to an item, and if an acquired character string contains a character, a symbol, a number, and other such elements not included in the acquired candidates, the determination unit 22 determines that the character string does not correspond to the item. In this regard, the foregoing description of the exemplary embodiment is directed to the case in which the above-mentioned candidates are characters, symbols, and numbers. However, this is not to be construed restrictively. Such candidates may be character codes. For example, character codes and character code ranges may be set as candidates, and if the character code of a character in a character string is not included in the character codes set as candidates, then it may be determined that a character string corresponding to an item has not been successfully acquired.

In accordance with the acquisition or non-acquisition state of an item and a character string that has been determined by the determination unit 22, the controller 23 causes the settings on preprocessing or character recognition to be changed so that preprocessing or character recognition is performed in accordance with the changed settings.

The memory 24 stores an image to be recognized, a recognition result, character string candidates, and a location from which an item and a character string have been acquired. The memory 24 also stores a priority database (to be referred to as "priority DB" hereinafter) described later.

Figure 4:
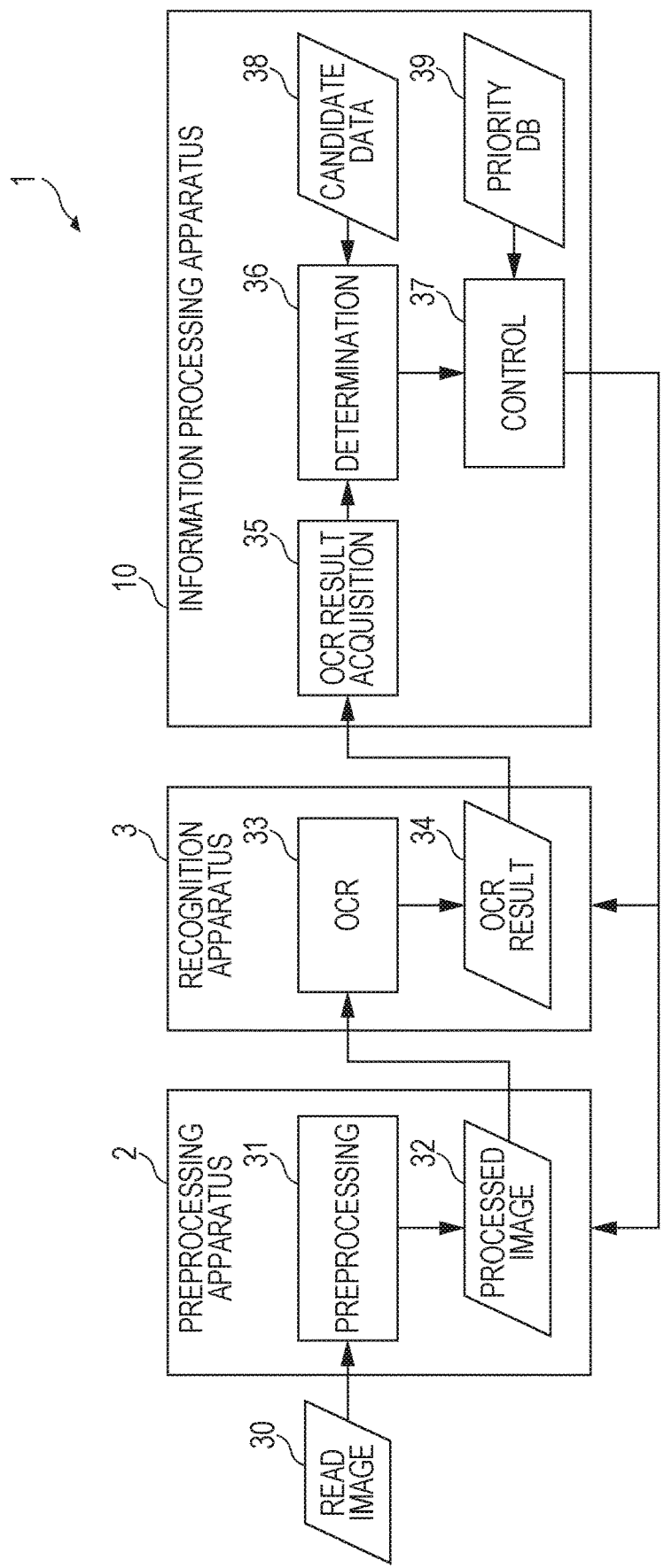
FIG. 4 is a data flowchart illustrating exemplary processing performed by the information processing system in accordance with the exemplary embodiment.
Figure 5:
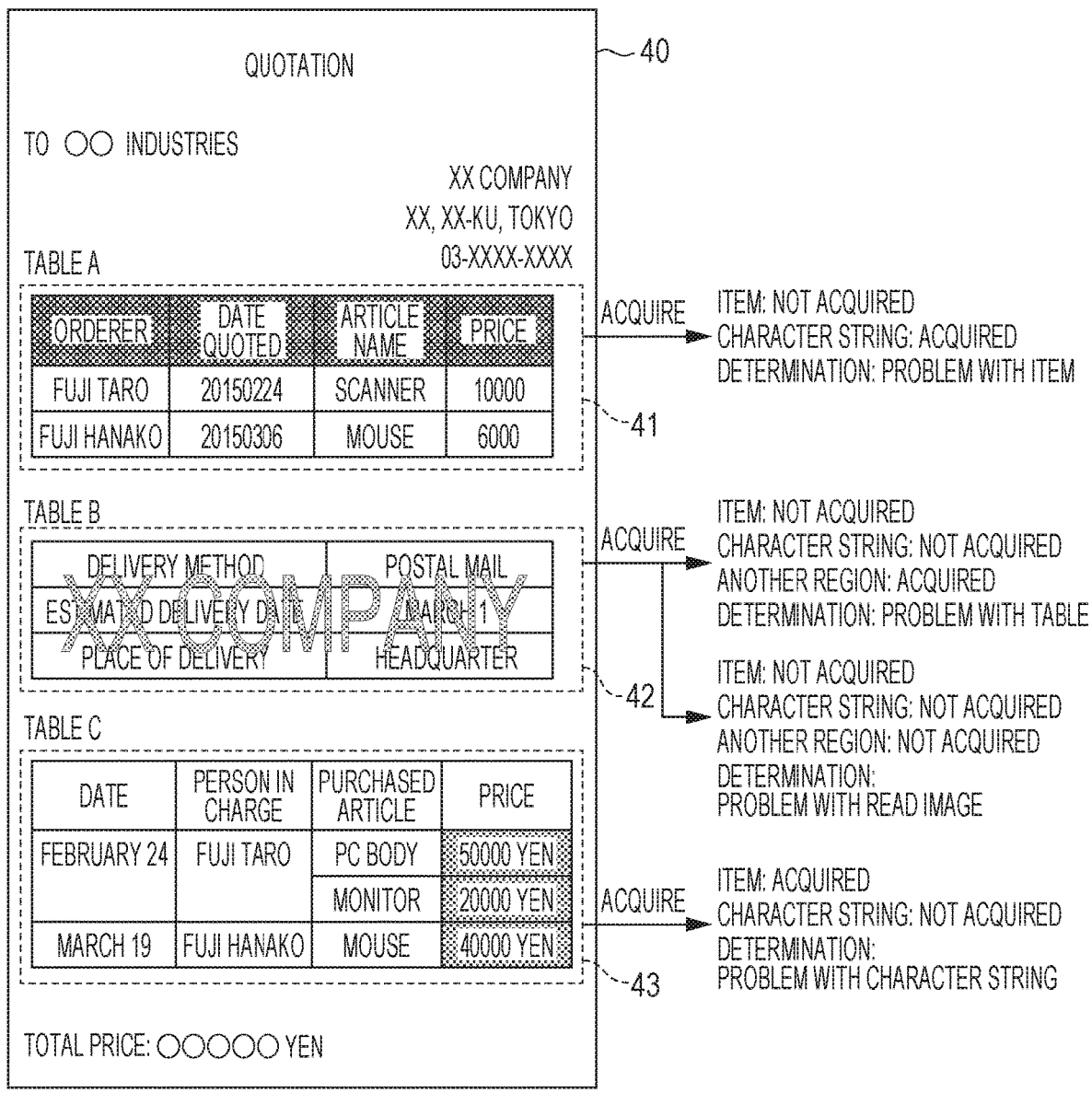
FIG. 5 schematically illustrates an exemplary document that has been read in accordance with the exemplary embodiment.

Before describing operation of the information processing apparatus 10, a description will now be given with reference to FIGS. 4 to 6 of a method according to the exemplary embodiment for performing preprocessing or character recognition in accordance with the acquisition or non-acquisition state of an item and a character string. FIG. 4 is a data flowchart illustrating exemplary processing performed by the information processing system in accordance with the exemplary embodiment. FIG. 5 schematically illustrates an exemplary document that has been read in accordance with the exemplary embodiment. FIG. 6 illustrates an exemplary priority database in accordance with the exemplary embodiment.

The following description of the exemplary embodiment will be directed to a case in which the information processing apparatus 10 extracts an item and a character string from each of Table A, Table B, and Table C contained in a document illustrated in FIG. 5. In this regard, Table A, Table B, and Table C each represent an exemplary identified location of an item and a character string.

As illustrated in FIG. 4, the information processing system 1 includes the preprocessing apparatus 2, the recognition apparatus 3, and the information processing apparatus 10.

The preprocessing apparatus 2 acquires a read image 30, which is an image obtained by reading a document. The preprocessing apparatus 2 performs preprocessing 31 such as image straightening and denoising on the read image 30, and outputs a processed image 32.

The recognition apparatus 3 acquires the processed image 32. The recognition apparatus 3 then performs, as OCR processing 33, key-value extraction on the processed image 32, and outputs an OCR result 34.

The information processing apparatus 10 performs determination processing 36 by using the OCR result 34 acquired through OCR-result acquisition processing 35. Specifically, the information processing apparatus 10 determines, for an item and a character string acquired from the OCR result 34, the acquisition or non-acquisition state of the item and the character string.

The information processing apparatus 10 performs control processing 37. The information processing apparatus 10 performs processing described below as the control processing 37. That is, by using a priority DB 39, the information processing apparatus 10 selects, in accordance with the result of the above-mentioned determination, what processing is to be performed to enable character recognition, and outputs an instruction to the preprocessing apparatus 2 or the recognition apparatus 3 that instructs the preprocessing apparatus 2 or the recognition apparatus 3 to re-execute processing.

For instance, as illustrated in FIG. 5, the information processing apparatus 10 extracts an item and a character string corresponding to Table A from a region 41 contained in a document 40 and bounded by a rectangle. However, in some cases, an item may not be successfully acquired because, as illustrated in FIG. 5, the corresponding item field in Table A contains white-on-black text with the characters in white on a black background.

The information processing apparatus 10 extracts an item and a character string corresponding to Table A from the region 41, and if the information processing apparatus 10 has successfully acquired the character string but has failed to acquire the item, the information processing apparatus 10 determines that there is a problem with the corresponding item in the region 41.

In response to determining that there is a problem with an item extracted from the region 41, the information processing apparatus 10 outputs an instruction to the preprocessing apparatus 2 that instructs the preprocessing apparatus 2 to execute inversion of white-on-black text on the corresponding item field in the region 41. As a result of the preprocessing apparatus 2 performing inversion of white-on-black text, the corresponding item and the corresponding character string in the region 41 will be extracted by the recognition apparatus 3 located downstream of the preprocessing apparatus 2.

In some cases, as illustrated in FIG. 5, a watermark is placed on Table B so as to overlap Table B, making it difficult to acquire an item and a character string that overlap the watermark.

The information processing apparatus 10 extracts an item and a character string corresponding to Table B from a region 42, and if the item and the character string are not successfully acquired, the information processing apparatus 10 determines whether an item and a character string have been successfully acquired from a region other than Table B.

For example, if an item and a character string corresponding to Table B and extracted from the region 42 have not been successfully acquired, and if an item and a character string corresponding to Table A and extracted from the region 41 have been successfully acquired, the information processing apparatus 10 determines that there is a problem with Table B in the region 42.

In response to determining that there is a problem with Table B, the information processing apparatus 10 outputs an instruction to the preprocessing apparatus 2 that instructs the preprocessing apparatus 2 to execute watermark removal. As a result of the preprocessing apparatus 2 performing watermark removal, the corresponding item and the corresponding character string in the region 42 will be extracted by the recognition apparatus 3 located downstream of the preprocessing apparatus 2.

Known related art methods remove a watermark by use of a learning model trained with a read image having a watermark placed thereon. However, cases may arise in which even if the preprocessing apparatus 2 incorporating an artificial intelligence (AI) with a learning model is instructed to execute watermark removal, acquisition of an item and a character string still fails because the learning model used for watermark removal is not compatible with a read image. To address this, the information processing apparatus 10 according to the exemplary embodiment outputs an instruction to the preprocessing apparatus 2 that instructs the preprocessing apparatus 2 to execute preprocessing after making a setting change, such as changing the learning model or changing the AI engine.

If an item and a character string corresponding to the region 42 are not successfully acquired, and if an item and a character string corresponding to the region 41 are not successfully acquired, the information processing apparatus 10 determines that there is a problem with the entire read image.

In response to determining that there is a problem with the entire read image, the information processing apparatus 10 determines that OCR has not been performed successfully by the recognition apparatus 3. The information processing apparatus 10 then outputs an instruction to the recognition apparatus 3 that instructs the recognition apparatus 3 to execute OCR after changing a setting on the recognition apparatus 3 such as changing the OCR engine. As a result of the recognition apparatus 3 executing OCR by using a different OCR engine, the corresponding item and the corresponding character string will be acquired from the read image.

There are also cases in which, as illustrated in FIG. 5, Table C includes shading applied to an entry field for the item "Price", and thus a character string associated with the item is not successfully acquired.

The information processing apparatus 10 extracts an item and a character string corresponding to Table C from a region 43, and if the information processing apparatus 10 has successfully acquired the item but has failed to acquire the character string, the information processing apparatus 10 determines that there is a problem with the character string in the region 43.

In response to determining that there is a problem with a character string extracted from the region 43, the information processing apparatus 10 outputs an instruction to the preprocessing apparatus 2 that instructs the preprocessing apparatus 2 to execute shading removal. The information processing apparatus 10 outputs an instruction to the preprocessing apparatus 2 that instructs the preprocessing apparatus 2 to execute shading removal for the region 43. As a result of the preprocessing apparatus 2 executing shading removal, the corresponding item and the corresponding character string in the region 43 will be extracted by the recognition apparatus 3 located downstream of the preprocessing apparatus 2.

In response to successfully acquiring an item and a character string, the information processing apparatus 10 determines whether the character string corresponds to the item. As illustrated in FIG. 4, in determining whether a character string corresponds to an item, the information processing apparatus 10 acquires, from candidate data 38, character string candidates corresponding to the item, and performs this determination.

In response to determining that the character string is not considered as corresponding or identical to the item, the information processing apparatus 10 determines that there is a problem with OCR. The information processing apparatus 10 then outputs an instruction to the recognition apparatus 3 that instructs the recognition apparatus 3 to change the OCR dictionary. As a result of the recognition apparatus 3 changing the OCR dictionary, the corresponding item and the corresponding character string are now successfully extracted by the recognition apparatus 3.

To avoid complication, the foregoing description of the exemplary embodiment is directed to performing, for each single identified problem, a single handling method for handling the problem, and then re-executing the recognition processing. However, this is not to be construed restrictively. There may be plural handing methods for each single determined problem.

In one example, in response to determining that there is a problem with an item or a character string, the information processing apparatus 10 may output an instruction to the preprocessing apparatus 2 that instructs the preprocessing apparatus 2 to execute shading removal, inversion of white-on-black text, colored-background removal, changing of the AI engine, watermark removal, and background-pattern removal. In another example, in response to determining that there is a problem with an item or a character string, the information processing apparatus 10 may output an instruction to the recognition apparatus 3 that instructs the recognition apparatus 3 to perform changing of the relative positions of the item and the character string and changing of the OCR engine, or inversion of white-on-black text. In another example, in response to determining that there is a problem with a table or a read image, the information processing apparatus 10 may output an instruction to the preprocessing apparatus 2 that instructs the preprocessing apparatus 2 to execute shading removal, colored-background removal, changing of the AI engine, watermark removal, and background-pattern removal. In another example, in response to determining that there is a problem with a table or a read image, the information processing apparatus 10 may output an instruction to the recognition apparatus 3 that instructs the recognition apparatus 3 to change the OCR engine and the OCR dictionary.

Specifically, the information processing apparatus 10 acquires the priority DB 39 illustrated in FIG. 6, and selects a handling method. The priority DB 39 includes items of information such as "Priority", "Handling Method", "Target Apparatus" and "Problem Details". The "Priority" refers to the order in which to execute individual handling methods. The "Handling Method" describes an instruction output in response to an identified problem. The "Target Apparatus" refers to the name of an apparatus to which an instruction to execute the corresponding handling method is output. The "Problem Details" provide the details of a problem determined by the information processing apparatus 10. The symbol "0" in the "Problem Details" indicates that the handling method of interest is selectable for the corresponding determined problem.

For instance, in response to determining that "there is a problem with an item", the information processing apparatus 10 selects a handling method marked "0" in the "Item" column of the "Problem Details", and outputs an instruction to a preset target apparatus that instructs the target apparatus to execute the selected handling method. At this time, each handling method to be selected is selected in descending order of priority. That is, the information processing apparatus 10 first executes "watermark removal", which is marked "0" in the "Item" column and has the priority "1", and if the problem is not addressed by this method, the information processing apparatus 10 then selects "background-pattern removal" that has the priority "2". If performing all selectable handling methods still fails to address the problem, the information processing apparatus 10 notifies the user of a failure to address the problem.

The priority according to the exemplary embodiment may be specified by the user. Alternatively, for each handling method, a count representing the number of times the corresponding problem has been addressed by the handling method may be stored, and the priority may be set so as to give higher priority for those methods with higher counts. Further, setting a handling method for each individual read image allows the corresponding problem to be addressed earlier, and thus the priority may be set for each individual read image stored.

Figure 7:
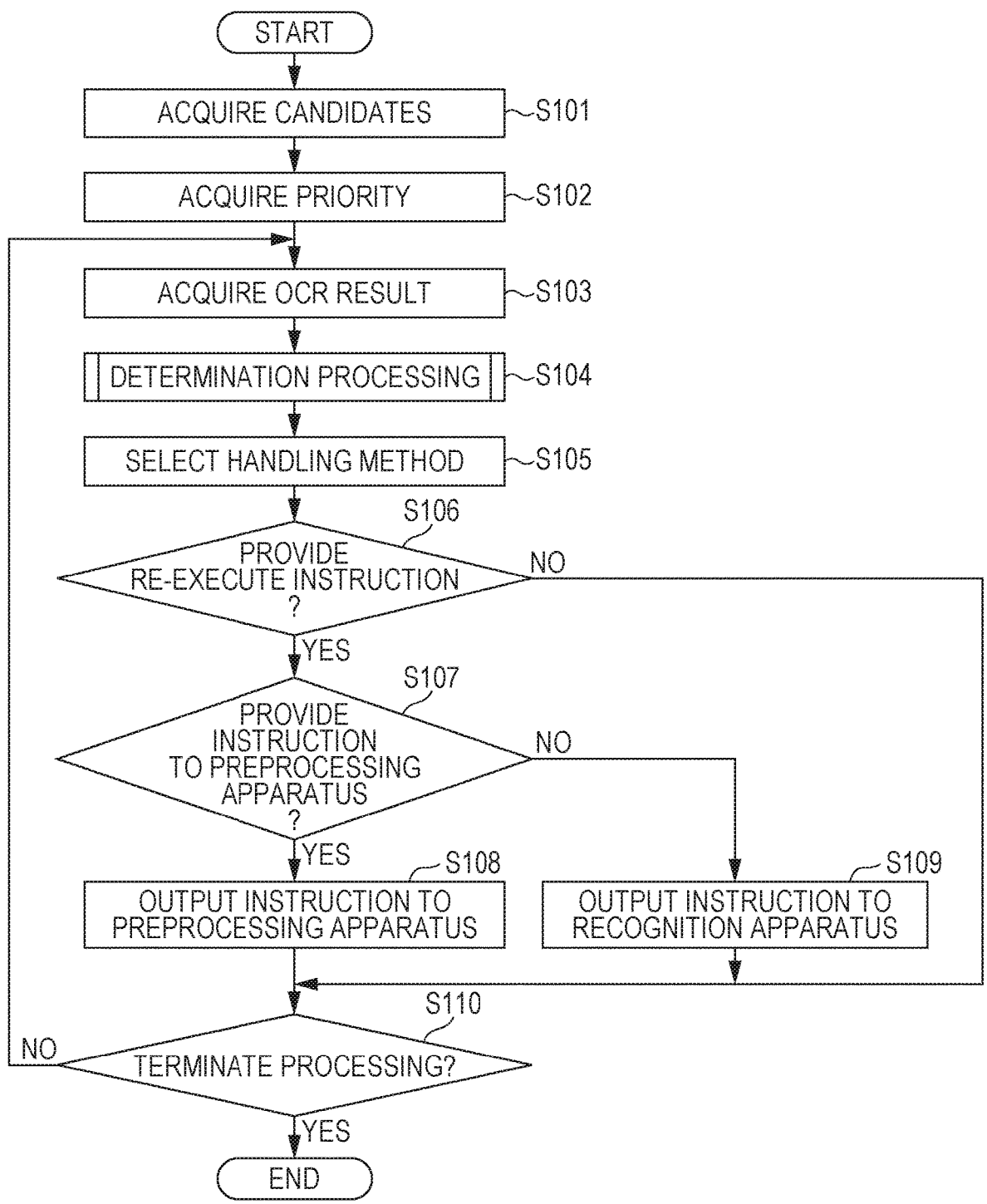
FIG. 7 is a flowchart illustrating exemplary information processing in accordance with the exemplary embodiment.
Figure 8:
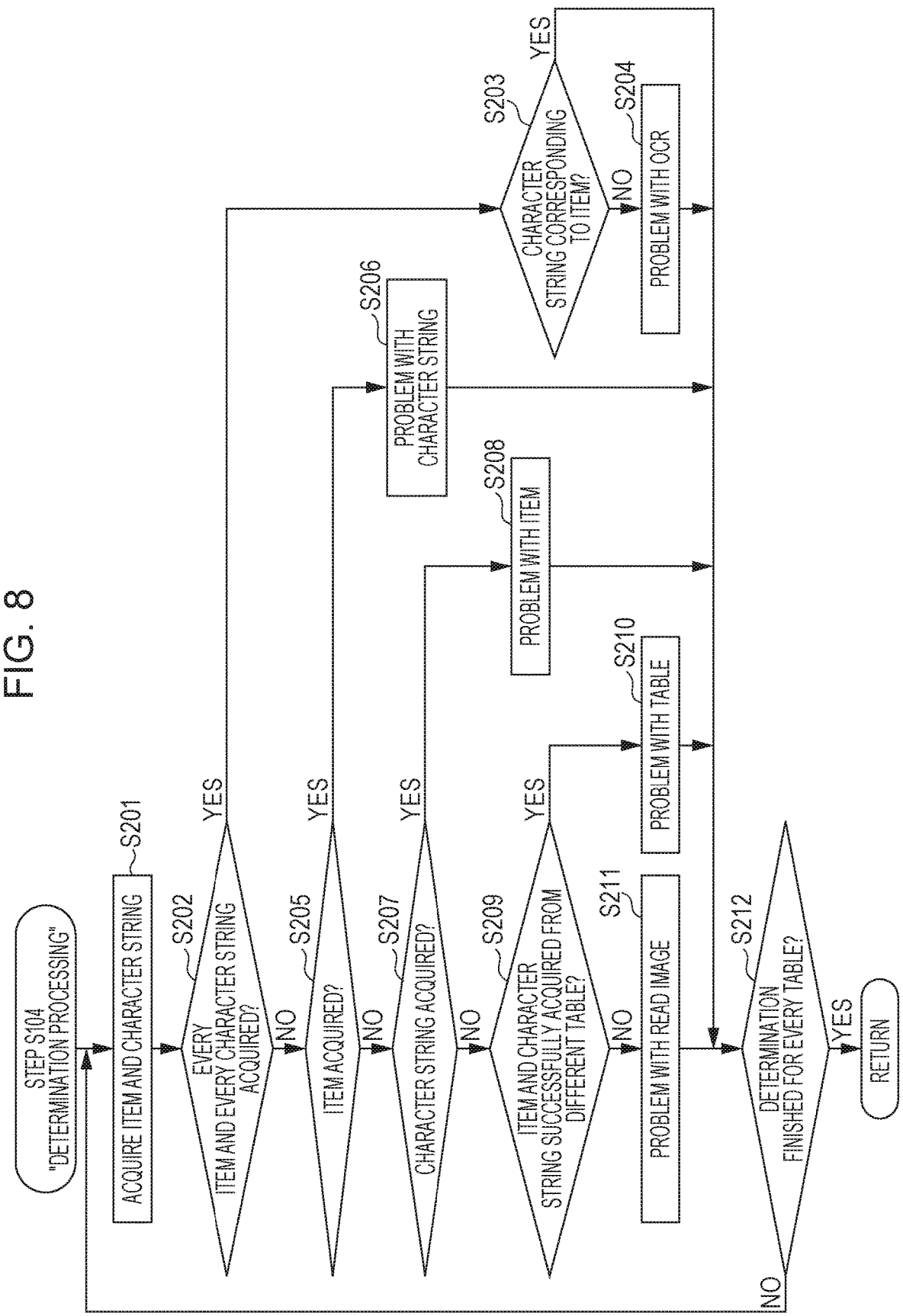
FIG. 8 is a flowchart illustrating exemplary determination processing in accordance with the exemplary embodiment.

A description will now be given with reference to FIGS. 7 and 8 of operation of an information processing program according to the exemplary embodiment. FIG. 7 is a flowchart illustrating exemplary information processing in accordance with the exemplary embodiment. The information processing illustrated in FIG. 7 is executed by the CPU 11 reading an information processing program from the ROM 12 or the storage 14 and executing the program. The information processing in FIG. 7 is executed in response to, for example, the user inputting an instruction that the information processing program be executed.

At step S101, the CPU 11 acquires character string candidates corresponding to an item.

At step S102, the CPU 11 acquires the priority DB containing the priority of each handling method.

At step S103, the CPU 11 acquires an OCR result from the recognition apparatus 3.

At step S104, determination processing is executed. The determination processing will be described later in detail with reference to FIG. 8.

At step S105, the CPU 11 selects a handling method by using the priority DB 39.

At step S106, the CPU 11 determines whether to output a re-execute instruction, which indicates the presence of a problem and the need to re-execute processing. In response to determining to output a re-execute instruction (step S106: YES), the CPU 11 transfers to step S107. In response to determining not to output a re-execute instruction (step S106: NO), the CPU 11 transfers to step S110.

At step S107, the CPU 11 determines whether to output the instruction to the preprocessing apparatus 2. In response to determining to output the instruction to the preprocessing apparatus 2 (step S107: YES), the CPU 11 transfers to step S108. In response to determining not to output the instruction to the preprocessing apparatus 2 (i.e., determining to output the instruction to the recognition apparatus 3) (step S107: NO), the CPU 11 transfers to step S109.

At step S108, the CPU 11 outputs the instruction to the preprocessing apparatus 2 to instruct the preprocessing apparatus 2 to execute the selected handling method.

At step S109, the CPU 11 outputs the instruction to the recognition apparatus 3 to instruct the recognition apparatus 3 to execute the selected handling method.

At step S110, the CPU 11 determines whether to terminate the information processing. In response to determining to terminate the information processing (step S110: YES), the CPU 11 terminates the information processing. In response to determining not to terminate the information processing (step S110: NO), the CPU 11 transfers to step S103. In the exemplary embodiment, if no instruction is to be output to the preprocessing apparatus 2 or the recognition apparatus 3, the information processing is terminated.

A description will now be given with reference to FIG. 8 of operation of a determination processing program according to the exemplary embodiment. FIG. 8 is a flowchart illustrating exemplary determination processing in accordance with the exemplary embodiment. The information processing illustrated in FIG. 8 is executed by the CPU 11 reading the determination processing program from the ROM 12 or the storage 14 and executing the program. The determination processing in FIG. 8 is executed in response to, for example, input of an instruction to execute the determination processing program from the information processing program.

At step S201, the CPU 11 extracts, from an OCR result, an item and a character string that correspond to a table.

At step S202, the CPU 11 determines whether every item and every character string have been successfully acquired. If every item and every character string have been successfully acquired (step S202: YES), the CPU 11 transfers to step S203. If at least one item or at least one character string has not been successfully acquired (step S202: NO), the CPU 11 transfers to step S205.

At step S203, the CPU 11 determines whether the acquired character string corresponds to the item. If the acquired character string corresponds to the item (step S203: YES), the CPU 11 transfers to step S212. If the acquired character string does not correspond to the item (step S203: NO), the CPU 11 transfers to step S204.

At step S204, the CPU 11 determines that there is a problem with OCR.

At step S205, the CPU 11 determines whether the item has been successfully acquired. If the item has been successfully acquired (step S205: YES), the CPU 11 transfers to step S206. If the item has not been successfully acquired (step S205: NO), the CPU 11 transfers to step S207.

At step S206, the CPU 11 determines that there is a problem with the character string.

At step S207, the CPU 11 determines whether the character string has been successfully acquired. If the character string has been successfully acquired (step S207: YES), the CPU 11 transfers to step S208. If the character string has not been successfully acquired (step S207: NO), the CPU 11 transfers to step S209.

At step S208, the CPU 11 determines that there is a problem with the item.

At step S209, the CPU 11 determines whether an item and a character string have been successfully acquired from a table different from the table from which an item and a character string have not been successfully acquired. If an item and a character string have been successfully acquired from the different table (step S209: YES), the CPU 11 transfers to step S210. If an item and a character string have not been successfully acquired from the different table (step S209: NO), the CPU 11 transfers to step S211.

At step S210, the CPU 11 determines that there is a problem with the table from which an item and a character string have not been successfully acquired.

At step S211, the CPU 11 determines that there is a problem with the image that has been recognized.

At step S212, the CPU 11 determines whether the above-mentioned determination has been executed for every table. If the determination has been executed for every table (step S212: YES), the CPU 11 terminates the determination processing. If the determination has not been executed for every table (step S212: NO), the CPU 11 transfers to step S201.

As described above, in accordance with the acquisition or non-acquisition state of an item and a character string during key-value extraction, a handling method for facilitating successful recognition of such an item and a character string is selected. Therefore, with the exemplary embodiment, if a character string is not successfully acquired from a document, a preprocessing process that enables recognition of such a character string may be selected, and then recognition of the character string may be re-executed.

In the foregoing description of the exemplary embodiment, based on the result of key-value extraction executed after OCR processing, either one of preprocessing executed before the key-value extraction, and the OCR processing is selected, and an instruction is output that instructs that the selected processing be executed after the corresponding setting is changed. However, this is not to be construed restrictively. That is, based on the result of given processing, which one of plural preprocessing processes that affect the processing is to be re-executed may be determined.

For instance, it is now assumed that the processing subject to determination is OCR, and plural preprocessing processes include background-pattern removal, and seal removal that removes a red personal seal. In this case, if extraction of character strings from an OCR result fails on the whole, it is determined that imaging processing has not been successfully performed on the entire document, in other words, it is determined that inappropriate image processing for background-pattern removal has been performed. Then, an instruction is output to instruct that image processing for background-pattern removal be re-executed by using a different set value. In this regard, the background pattern of a document often varies with the entity that provides the document. Thus, in some cases, the problem may be addressed by changing a set value for background-pattern removal.

A case is now considered in which a character recognition result has been successfully acquired, but characters have not been successfully recognized only for some region of a document. In this case, it is determined that an inappropriate parameter has been used for removal of a red personal seal, which is image processing performed on a specific region, and an instruction is output to instruct that image processing for seal removal be re-executed after the corresponding set value is changed.

The configuration of the information processing apparatus 10 described above with reference to the exemplary embodiment is only illustrative, and may be modified in accordance with the circumstances without departing from the scope of the present disclosure.

The procedure for processing executed by each program described above with reference to the above-mentioned exemplary embodiment is also only illustrative. Unnecessary steps may be removed, new steps may be added, or the order of processing may be changed, without departing from the scope of the present disclosure.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application-Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Although the foregoing description of the exemplary embodiment is directed to the case in which the program for processing information is pre-stored (pre-installed) in the storage 14, this is not to be construed restrictively. The program may be provided while being stored in a storage medium, examples of which include a compact disc read only memory (CD-ROM), a digital versatile disc read only memory (DVD-ROM), and a universal serial bus (USB) memory. Alternatively, the program may be downloaded from an external apparatus via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    acquire, from a read image, a predetermined item, and a value corresponding to the item, the read image being obtained by reading a document, the read image being subjected, prior to acquisition of the item and the value, to preprocessing and character recognition, and
    in response to not successfully acquiring at least one of the item and the value, change a setting on the preprocessing or a setting on the character recognition in accordance with an acquisition or non-acquisition state of the item and the value, and then perform the preprocessing or the character recognition, wherein in response to not successfully acquiring at least one of the item and the value, the processor is further configured to identify where the item and the value are located.

2. The information processing apparatus according to claim 1,
    wherein the processor is configured to previously store a candidate of the value corresponding to the item, and if the candidate and the value are not considered as identical, determine that the value does not correspond to the item.

3. The information processing apparatus according to claim 2,
    wherein the preprocessing comprises a plurality of predetermined processes, and
    wherein the processor is configured to, in response to not successfully acquiring at least one of the item and the value from a result of the preprocessing performed with the setting changed and from a result of the character recognition performed with the setting changed, again perform a preprocessing different from the preprocessing, or character recognition different from the character recognition.

4. The information processing apparatus according to claim 3,
    wherein the processor is configured to, in response to applying all of the plurality of the predetermined processes and not successfully acquiring at least one of the item and the value from a result of the character recognition performed with the plurality of the predetermined processes applied, provide notification of a failure to acquire the item and the value.

5. The information processing apparatus according to claim 2,
    wherein the processor is configured to, in response to not successfully acquiring at least one of the item and the value, identify where the item and the value are located from a different table.

6. The information processing apparatus according to claim 3, wherein the processor is configured to, in response to not successfully acquiring at least one of the item and the value, identify where the item and the value are located from a different table.

7. The information processing apparatus according to claim 1,
    wherein the preprocessing comprises a plurality of predetermined processes, and
    wherein the processor is configured to, in response to not successfully acquiring at least one of the item and the value from a result of the preprocessing performed with the setting changed and from a result of the character recognition performed with the setting changed, again perform a preprocessing different from the preprocessing, or character recognition different from the character recognition.

8. The information processing apparatus according to claim 7,
    wherein the processor is configured to, in response to applying all of the plurality of the predetermined processes and not successfully acquiring at least one of the item and the value from a result of the character recognition performed with the plurality of the predetermined processes applied, provide a notification of a failure to acquire the item and the value.

9. The information processing apparatus according to claim 7,
wherein the processor is configured to, in response to not successfully acquiring at least one of the item and the value, identify where the item and the value are located from a different table.

10. The information processing apparatus according to claim 1,
wherein the processor is configured to, in response to not successfully acquiring at least one of the item and the value, identify where the item and the value are located from a different table.

11. The information processing apparatus according to claim 1,
wherein the processor is configured to, in response to not successfully acquiring the item and the value, determine whether an item and a value located in an area different from the item and the value have been successfully acquired.

12. The information processing apparatus according to claim 11,
wherein the processor is configured to, in response to successfully acquiring the item and the value located in the different area, change a setting on removal of a background pattern and a watermark.

13. The information processing apparatus according to claim 1,
wherein each of the preprocessing and the character recognition comprises a plurality of processes, and a priority is set for each of the plurality of processes, and
wherein the processor is configured to change the at least one setting in accordance with the priority.

14. An information processing system comprising:
an information processing apparatus including a processor, the processor being configured to
acquire, from a read image, a predetermined item, and a value corresponding to the item, the read image being obtained by reading a document, the read image being subjected, prior to acquisition of the item and the value, to preprocessing and character recognition, and
in response to not successfully acquiring at least one of the item and the value, change a setting on the preprocessing or a setting on the character recognition in accordance with an acquisition or non-acquisition state of the item and the value, and then perform the preprocessing or the character recognition, wherein in response to not successfully acquiring at least one of the item and the value, the processor is further configured to identify where the item and the value are located;
a preprocessing apparatus that performs the preprocessing; and
a character recognition apparatus that performs the character recognition,
the preprocessing apparatus and the character recognition apparatus performing, in response to an instruction from the information processing apparatus, processing for facilitating character recognition.

15. The information processing system according to claim 14,
wherein the processing for facilitating character recognition includes at least one of removal of a background pattern, removal of a watermark, inversion of white-on-black text, removal of shading, removal of a colored background, changing of a dictionary, and changing of an OCR engine.

16. A non-transitory computer readable medium storing a program causing a computer to execute a process for processing information, the process comprising:
acquiring, from a read image, a predetermined item, and a value corresponding to the item, the read image being obtained by reading a document, the read image being subjected, prior to acquisition of the item and the value, to preprocessing and character recognition; and
in response to not successfully acquiring at least one of the item and the value, changing a setting on the preprocessing or a setting on the character recognition in accordance with an acquisition or non-acquisition state of the item and the value, and then performing the preprocessing or the character recognition, wherein in response to not successfully acquiring at least one of the item and the value, the processor is further configured to identify where the item and the value are located.

* * * * *